US008640246B2

(12) United States Patent
McDougal et al.

(10) Patent No.: US 8,640,246 B2
(45) Date of Patent: Jan. 28, 2014

(54) DISTRIBUTED MALWARE DETECTION

(75) Inventors: Monty D. McDougal, St. Paul, TX (US);
William E. Sterns, Dallas, TX (US);
Randy S. Jennings, Plano, TX (US)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 13/169,574

(22) Filed: Jun. 27, 2011

(65) Prior Publication Data
US 2012/0330801 A1 Dec. 27, 2012

(51) Int. Cl.
*G06F 21/00* (2013.01)
*G06F 11/00* (2006.01)
*G06F 21/57* (2013.01)
*G06F 21/56* (2013.01)

(52) U.S. Cl.
CPC ............. *G06F 21/577* (2013.01); *G06F 21/56* (2013.01)
USPC .............................................. 726/25; 726/24

(58) Field of Classification Search
None
See application file for complete search history.

(56) References Cited

U.S. PATENT DOCUMENTS

| | | | |
|---|---|---|---|
| 8,065,179 B1 | 11/2011 | Karnik | |
| 2003/0023866 A1 | 1/2003 | Hinchliffe et al. | |
| 2005/0132184 A1 | 6/2005 | Palliyil et al. | |
| 2006/0282388 A1* | 12/2006 | Solomon et al. | 705/52 |
| 2007/0028291 A1* | 2/2007 | Brennan et al. | 726/1 |
| 2007/0150957 A1 | 6/2007 | Hartrell et al. | |
| 2008/0109871 A1* | 5/2008 | Jacobs | 726/1 |
| 2010/0077481 A1 | 3/2010 | Polyakov et al. | |
| 2010/0114714 A1 | 5/2010 | Vitek | |
| 2010/0192222 A1 | 7/2010 | Stokes et al. | |
| 2010/0281248 A1 | 11/2010 | Lockhart et al. | |
| 2011/0047620 A1 | 2/2011 | Mahaffey et al. | |
| 2012/0330863 A1 | 12/2012 | Mcdougal et al. | |

OTHER PUBLICATIONS

McDougal et al., "Multi-Nodal Malware Analysis," U.S. Appl. No. 13/087,447, filed Apr. 15, 2011, 35 pages, (1389).
McDougal et al., "System and Method for Sharing Malware Analysis Results," U.S. Appl. No. 13/169,503, filed Jun. 27, 2011, 33 pages (1390).
"U.S. Appl. No. 13/169,503, Non Final Office Action mailed Sep. 6, 2012", 16 pgs.
"U.S. Appl. No. 13/169,503, Response filed Dec. 6, 2012 to Non Final Office Action mailed Sep. 6, 2012", 14 pgs.
"U.S. Appl. No. 13/169,503 Response Filed Jun. 28, 2013 to Final Office Action mailed Feb. 28, 2013", 15 pgs.

(Continued)

*Primary Examiner* — Ryan Zeender
*Assistant Examiner* — H Rojas
(74) *Attorney, Agent, or Firm* — Schwegman, Lundberg & Woessner, P.A.

(57) ABSTRACT

According to one embodiment, a computer-implemented method includes accessing, using one or more processing units, a first file of a plurality of files requested to be analyzed for malware. Each of the plurality of files corresponds to a respective remote client of a plurality of remote clients. Further, the method includes: processing, using the one or more processing units, an analysis of the first file for malware; and generating an output comprising an indication of whether the first file comprises malware. The method also includes accessing, using the one or more processing units, an address for a first remote client of the plurality of remote clients. The first remote client is the respective remote client corresponding to the first file. In addition, the method includes: sending, using the one or more processing units, the output in a communication addressed to the first remote client corresponding to the first file.

21 Claims, 2 Drawing Sheets

(56) References Cited

OTHER PUBLICATIONS

"U.S. Appl. No. 13/169,503 Response Filed Apr. 16, 2013 to Final Office Action mailed Feb. 28, 2013", 14 pgs.
"U.S. Appl. No. 13/169,503, Advisory Action mailed May 7, 2013", 2 pgs.
"U.S. Appl. No. 13/169,503, Final Office Action mailed Feb. 28, 2013", 15 pgs.
"Application Serial No. ZL200780039216.7, Response filed Apr. 19, 2013 to Final Office Action mailed Mar. 28, 2013", 14 pgs.
"Trend Micro HouseCall", [Online] Retrieved From Internet: <http://web.archive.org/web/20100507053309/http://housecall.trendmicro.com/apac/?>, 2 pgs.

* cited by examiner

DISTRIBUTED MALWARE DETECTION

BACKGROUND

Malware (such as viruses, trojans, and other malicious software) has become increasingly difficult to protect against. Various methods have been used to combat malware, but more sophisticated malware continues to abound. Methods of detection have grown more complex but often these take longer to execute as a result of this complexity. Current, host-level malware protection systems search for files these systems can detect as being malware. However, malware protection limited to host systems is susceptible to numerous types of attacks. For example, zero-day attacks remain particularly problematic.

SUMMARY

According to one embodiment, a computer-implemented method includes accessing, using one or more processing units, a first file of a plurality of files requested to be analyzed for malware. Each of the plurality of files corresponds to a respective remote client of a plurality of remote clients. Further, the method includes: processing, using the one or more processing units, an analysis of the first file for malware; and generating an output comprising an indication of whether the first file comprises malware. The method also includes accessing, using the one or more processing units, an address for a first remote client of the plurality of remote clients. The first remote client is the respective remote client corresponding to the first file. In addition, the method includes: sending, using the one or more processing units, the output in a communication addressed to the first remote client corresponding to the first file.

Depending on the specific features implemented, particular embodiments may exhibit some, none, or all of the following technical advantages. Particular embodiments enable customers to offload malware analysis using services provided at an analysis console. The services may, in certain instances, include an assessment by one or more malware analysts of whether a file (or a collection of files) contains malware. Certain embodiments provide safe packaging of data analyzed at an analysis console to minimize the risk of infecting the analysis console with malware. Particular embodiments enable multiple clients to communicate with an analysis console over secure, encrypted data channels. In addition, particular clients may be capable of establishing respective sharing policies that determine the information those clients are willing to share with other clients through the analysis console. In certain embodiments, the sharing policies of various clients may be used to split between those clients the cost of performing malware analysis at the analysis console. In certain instances, costs may be apportioned between clients without revealing to any one client the identity of the other clients also billed for at least a portion of that particular malware analysis. Particular systems may be operable to minimize inefficiencies associated with "false positive" malware detections. Various systems may be capable of minimizing the malware processing load at an analysis console. Additionally, particular embodiments provide "offensive" applications for including hooks to collect suspected and/or confirmed malware for use by an analysis console and/or for use by clients in communication with that analysis console. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
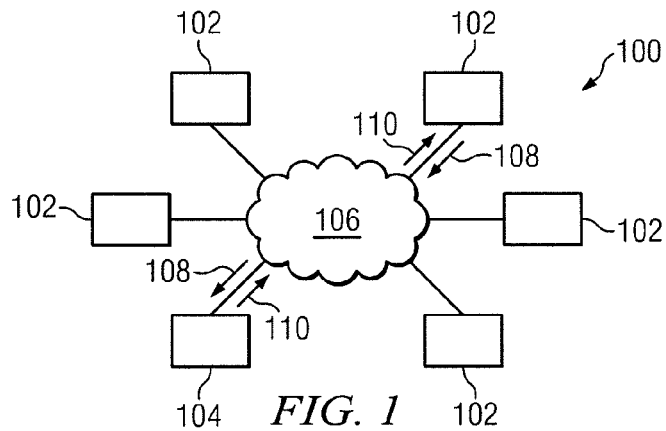
FIG. 1 is a block diagram illustrating one embodiment of a system for distributed malware analysis.

FIG. 1 is a block diagram illustrating one embodiment of a system 100 for distributed malware analysis. System 100 includes multiple clients 102 communicatively coupled to an analysis console 104 through a network 106. In certain embodiments, one or more clients 102 may be owned and/or operated by a different entity(ies) than the entity that owns and/or operates analysis console 104. Even if those one or more clients 102 are owned and/or operated by a different entity, those clients 102 still may be capable of communicating with analysis console 104 to use services (e.g., malware analysis services) provided at analysis console 104. As described further below, analysis console 104 may be capable of processing malware analysis requests communicated by clients 102 through network 106. In certain embodiments, data arriving at system 100 may be subjected to a two-stage analysis. The first stage may be implemented, for example, at the client 102 receiving the data. The second stage may be implemented, for example, at analysis console 104 per request of the client 102 based, for example, on a conclusion by that client 102 that the data is suspected of containing malware (or based on any other suitable reason). In certain instances, a sharing policy may permit the results of a particular malware analysis requested by one client 102 to be shared with other particular clients 102. In this manner, certain clients 102 may benefit from malware analysis results requested by other clients 102. In addition, the costs associated with analysis preformed at analysis console 104 may be distributed among those clients potentially benefiting from such an analysis.

In particular embodiments, clients 102 and analysis console 104 may communicate with each other using network 106. In certain instances, communication between one client 102 and analysis console 104 may be encrypted and/or may be indirect. For example, one or more of clients 102 and/or analysis console 104 may be in a demilitarized zone (DMZ) that may limit direct communication to other components of system 100. Particular clients 102 may be located remote from analysis console 104. Clients 102 that are located remote from analysis console 104 are referred to herein as "remote clients" 102.

As described further below, each client 102 may be capable of providing data 108 to analysis console 104 through network 106. The data may include any suitable combination of information regarding a file (or set of files), the results of malware analysis processed at the client 102, all or a portion of the file content, other information that may be used by analysis console 104 for malware analysis, and any other information. Analysis console 104 may be capable of communicating an output 110 to the same client 102. The output may indicate the result of a malware analysis processed at analysis console 104. In some instances, output 110 may be shared with all, most, or a selected subset of clients 102.

In various embodiments, clients 102 and/or analysis console 104 may be implemented using any suitable combination of hardware, firmware, or software. Clients 102 and/or analysis console 104 may be implemented on the same or different hardware in various suitable combinations. Further details regarding the implementation and/or operation of clients 102 and analysis console 104 are described below with reference to FIGS. 1-4.

In certain instances, analysis console 104 may identify a file as containing malware if it includes any of a variety of forms of hostile or intrusive computer-readable logic designed to infiltrate a computer system. Particular forms of malware may include computer viruses, worms, trojan horses, spyware, adware, crimeware, and other malicious and unwanted software. For purposes of this disclosure, a file may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which malware detection may be appropriate. In some embodiments, the term file as used herein may refer to a collection of files. For example, a ZIP file or other archive or compressed file type may include multiple embedded files.

Clients 102, in certain embodiments, are each operable to facilitate communicating malware analysis requests to analysis console. In certain embodiments, clients 102 may generate information that is accessible by analysis console 104 for further malware analysis of one or more files suspected of malware. For example, the information may correspond to one or more files subjected to a set of malware detection process run by the client 102. The client 102 may determine, based on a result of those malware detection processes, that the one or more files analyzed at that client 102 are suspected of containing malware. Accordingly, the client 102 may submit a request to analysis console for further malware analysis of those file or files suspected of containing malware. In certain instances, the request may include the file or files themselves and/or may include information pertaining to those files.

Each client 102 may comprise one or more processing systems at one or more locations. As examples and not by way of limitation, client 102 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, another type of host, or a combination of two or more of these. Where appropriate, clients 102 may include one or more computer systems; be unitary or distributed; span multiple locations; span multiple machines; or reside in a cloud, which may include one or more cloud components in one or more networks. Where appropriate, one or more clients 102 may perform without substantial spatial or temporal limitation one or more steps of one or more methods described or illustrated herein. As an example and not by way of limitation, one or more clients 102 may perform in real time or in batch mode one or more steps of one or more methods described or illustrated herein. One or more clients 102 may perform at different times or at different locations one or more steps of one or more methods described or illustrated herein, where appropriate.

This disclosure contemplates clients 102 having any suitable number of any suitable components in any suitable arrangement. In particular embodiments, each client 102 may include a variety of tangible components (e.g., one or more processors, memory, storage, an input/output (I/O) interface, a communication interface, a bus, etc.). One or more processors of particular clients 102 may include hardware for executing instructions, such as those making up a computer program.

Analysis console 104, in various embodiments, is operable to facilitate the processing of malware analysis requests submitted by one or more clients 102. In certain embodiments, analysis console 104 may be operable to access information generated by clients 102 and to facilitate the propagation of information to clients 102. The information propagated to particular clients 102 may include malware analysis outputs generated by analysis console 104, such that certain clients 102 may benefit from the results of malware detections and analysis by other clients 102 and/or analysis console 104. In addition, the information propagated to each client 102 may include one or more updates generated by analysis console 104. In certain instances, the clients 102 may be operable to use these updates in implementing various malware detection processes. Certain clients 102 may have respective sharing policies that control the type of information corresponding to those clients 102 that analysis console 104 may share with certain other clients 102, as explained further below.

Analysis console 104 may comprise one or more processing systems at one or more locations. As example and not by way of limitation, analysis console 104 may be an embedded computer system, an SOC, an SBC (e.g., a COM or SOM), a desktop computer system, a laptop or notebook computer system, an interactive kiosk, a mainframe, a mesh of computer systems, a mobile telephone, a PDA, a server, another type of host, or a combination of two or more of these. Where appropriate, analysis console 104 may include one or more computer systems; be unitary or distributed; span multiple locations; span multiple machines; or reside in a cloud, which may include one or more cloud components in one or more networks. Where appropriate, analysis console 104 may perform without substantial spatial or temporal limitation one or more steps of one or more methods described or illustrated herein. As an example and not by way of limitation, analysis console 104 may perform in real time or in batch mode one or more steps of one or more methods described or illustrated herein. Analysis console 104 may perform at different times or at different locations one or more steps of one or more methods described or illustrated herein, where appropriate.

This disclosure contemplates analysis console 104 having any suitable number of any suitable components in any suitable arrangement. In particular embodiments, analysis console 104 may include a variety of tangible components (e.g., one or more processors, memory, storage, an I/O interface, a communication interface, a bus, etc.). In particular embodiments, analysis console 104 may include one or more processors each having hardware for executing instructions, such as those making up a computer program. One example of the internal components that may be included in an analysis console 300 is described further below with reference to FIG. 3.

Network 106, in some embodiments, may be communicative platforms operable to exchange data or information. In various embodiments, network 106 may include one or more packet data networks offering communication interfaces or exchanges between components of system 100. Network 106 may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, network 106 may include firewalls or other equipment or software that create security zones and/or secure networks such as DMZs. One or more of clients 102 and/or analysis console 104 may be located in one more of such security zones and/or secure networks in some embodiments. For example, analysis console 104 may be in a DMZ that is separate from one or more clients 102. As another example, one client 102 may be in a different security zone than another client 102.

In operation of an example embodiment of system 100, one of the clients 102 may access a first file (or a set of files) and run a set of malware detection processes using the accessed first file (or files). One possible result of the malware detection processes may be a determination by the client 102 that the first file should be analyzed further for malware. In response to this determination, the client 102 may generate information related to the first file for use in a second stage of malware analysis to be processed at analysis console 104. That is, in certain instances, the processing performed by a particular client 102 may be considered the first stage of a multi-stage malware analysis; and the processing performed at analysis console 104 may be considered a second stage of the multi-stage malware analysis.

Analysis console 104 is capable of managing a queue of requests for malware analysis submitted by clients 102. According to one embodiment, the analysis performed at analysis console 104 includes accessing a first file (or set of files) suspected by a first client 102 as containing malware and/or accessing information pertaining to that first file. A malware analysis is processed at analysis console 104, which in certain instances may include processing input entered by a human review of that file and/or its corresponding information. As a result of the malware analysis processed at analysis console 104, an output may be generated by analysis console 104. The output may include, for example, an indication of whether the first file (or files) is known to be malware. In addition, the output may include the identifier for the first file. The analysis console 104 may access an address for the first client 102 that had requested the malware analysis for that first file. The analysis console 104 sends the output in a communication addressed to that first client 102. In certain embodiments, the output may be shared with clients 102 other than the first client 102 according to a sharing policy of the first client 102, which had requested the malware analysis of the first file. Each client 102 receiving the output may update a respective stored set of identifiers of files known to be malware or a respective stored set of identifiers known not to be malware, based on the indication of the output generated by analysis console 104 regarding whether the first file is malware.

The operation described above illustrates one example of how clients 102 and analysis console 104 may operate cooperatively with each other to facilitate malware analysis. In certain instances, system 100 may be operable to minimize the risk and inefficiencies associated with "false negative" malware detections by clients 102 by sharing such information among clients 102 (e.g., through analysis console 104 and/or network 106). In addition, system 100 may be operable to minimize inefficiencies associated with "false positive" malware detections by clients 102. For example, a particular file might test positive for malware as a result of a set of malware detection processes run at a particular client 102, but then further analysis at analysis console 104 may result in a final adjudication that the file is known not to be malware. Because the results of the final adjudication may, in certain instances, be shared with other clients 102, those clients 102 receiving the output may later process similar malware detections using this final adjudication, without necessarily requesting further analysis to be performed at analysis console 104. Such a scenario illustrates one way in which the processing load at analysis console 104 may be minimized.

In particular embodiments, one or more clients 102 and/or analysis console 104 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Depending on the specific features implemented, particular embodiments may exhibit some, none, or all of the following technical advantages. Particular embodiments enable customers to offload malware analysis using services provided at analysis console 104. The services may, in certain instances, include an assessment by one or more malware analysts of whether a file (or a collection of files) contains malware. Certain embodiments provide safe packaging of data 108 while in transit and while analyzed at analysis console 104 to make certain the data is secure and to minimize the risk of infecting analysis console 104 with malware. Particular embodiments enable multiple clients 102 to communicate with analysis console 104 over secure, encrypted data channels. In addition, particular clients 102 may be capable of establishing respective sharing policies that determine the information those clients 102 are willing to share with other clients 102 through analysis console 104. In certain embodiments, the sharing policies of various clients 102 may be used to split between those clients 102 the cost of performing malware analysis at analysis console 104. In certain instances, costs may be apportioned between clients 102 without revealing to any one client 102 the identity of the other clients 102 also billed for at least a portion of that particular malware analysis. Particular systems may be operable to minimize inefficiencies associated with "false positive" malware detections. Various systems may be capable of minimizing the malware processing load at analysis console 104. Additionally, particular embodiments provide applications for other uses including hooks to collect suspected and/or confirmed malware for use by analysis console 104 and/or for use by clients 102 in communication with analysis console 104. Other technical advantages will be readily apparent to one skilled in the art from the present disclosure.

Figure 2:
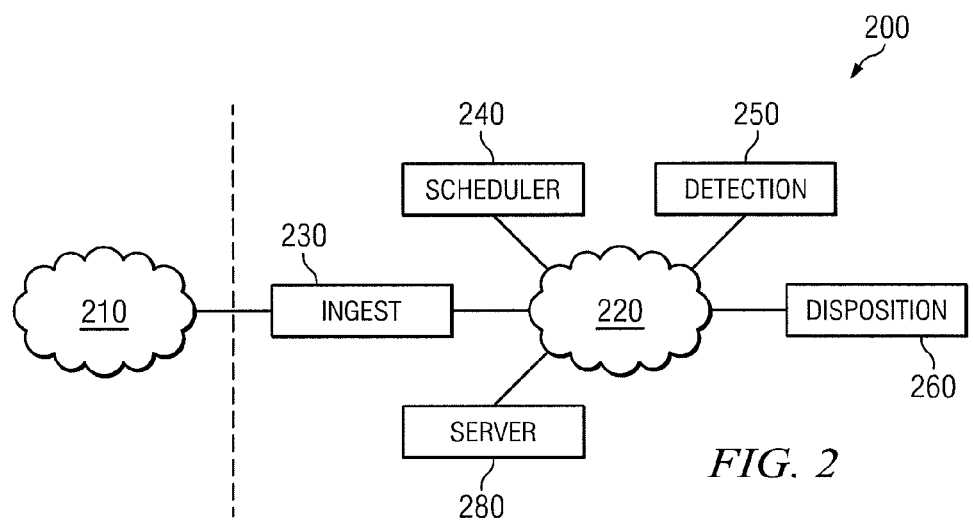
FIG. 2 illustrates one embodiment of a client suitable for implementing one or more portions of particular embodiments.

FIG. 2 illustrates one embodiment of a client 200. In certain embodiments, one or more clients 102 of FIG. 1 may be substantially similar to client 200. However, the present disclosure contemplates one or more of clients 102 of FIG. 1 being implemented differently than client 200. As shown in FIG. 2, client 200 includes an ingest block 240, a detection block 250, a disposition block 260, a server 280, and an internal network 220. Internal network 220, in certain embodiments, refers to any interconnecting system capable of transmitting audio, video, signals, data, messages, or any combination of the preceding between blocks 230-280. According to one embodiment, interconnecting system includes a system bus. Client 200 is in communication with an external network 210, which in certain embodiments may be substantially similar to network 106 of FIG. 1. In various embodiments, blocks 220-280 may represent hardware, software, or a combination of the two.

According to one embodiment, the implementation and/or operation of blocks 220-280 may be described generally as follows. Ingest block 230 accesses a file and determines that one or more tests that should be performed on the file in order to determine whether the file is suspected of malware. In response, detection block 250 performs the test(s) that were determined by ingest block 230 in accordance with scheduling performed by scheduler block 240. Disposition block 260 utilizes the results of the tests performed by detection block 250 to determine whether the file(s) should be sent to server block 280 for quarantine purposes while a second analytical stage for the file is processed (e.g., at analysis console 104). Further detail regarding the implementation and/or operation of blocks 220-280 are described below.

Ingest block 230 may be implemented using any suitable combination of hardware, firmware, or software. In certain instances, ingest block 230 may reside on the same hardware that blocks 240-280 reside upon or on different hardware. Ingest block 230 may be operable to extract and cause to be analyzed the files that are accessed by client 200. Ingest block 230 may analyze the file(s) and determine one or more tests that should be performed on the file(s) in order to determine whether the file is suspected of malware. In certain embodiments, ingest block 230 may be configured to determine the type of file that ingest block 230 receives. For example, ingest block 230 may examine an extension associated with the file name to determine the type of the file. As another example, ingest block 230 may examine portions of the file content in order to determine its type. Ingest block 230 may look at characters in a header of a file to determine its type. Such characters may be referred to as magic numbers or magic bits. In this manner, in some embodiments, ingest block 230 may detect the correct type of the file even if the extension of the file's name has been removed or changed. As another example, for certain types of files (e.g., MICROSOFT OFFICE files), ingest block 230 may determine the file type based on both magic number(s) and the file extension, possibly examining the magic number(s) prior to examining the file extension.

In various embodiments, ingest block 230 may be configured to determine whether a file has been previously analyzed for malware. Ingest block 230 may use one or more techniques to determine if a file has been previously analyzed for malware. For example, ingest block 230 may generate one or more hashes of content of the file (such as a checksum, an MD5 hash, and/or a SHA1 hash). These value(s) may be compared to a database containing hash values of previously analyzed files. If the hash value is found in data storage, ingest block 230 may determine that the file has been previously analyzed. If the hash value is not present in data storage, ingest block 230 may determine that the file has not been previously analyzed. In some embodiments, ingest block 230 may use the name of the file and/or its extension, as well as variations on those items, to determine if the file has been previously analyzed.

If it is determined that a file has been analyzed previously, malware detection schemes may not be applied to the file; instead, the results of the previous analysis of the file may be determined using a database that contains results of a previous analysis of the file. If the results indicate that the file is known not to be malware, then the analysis of the file may end. If it is determined that the file was previously determined to be malware, then it may be determined that the file should be quarantined. If it is determined that the file has been previously received and is currently being analyzed (e.g., possibly including review by human analysts), then action may be taken once the outcome of the ongoing analysis is known. In some embodiments, this may allow for more efficient utilization of the resources that perform the malware detection schemes on the files and may reduce the workload of a machine and/or human analyst.

In certain embodiments, ingest block 230 may be used to determine whether a file should undergo malware detection and/or which malware detection schemes should be applied. For example, ingest module 230 may determine that a file received by ingest module 210 is a plain text file. Ingest block 230 may then retrieve one or more policies associated with plain text files. A retrieved policy may indicate that plain text files are not to be analyzed for malware. As a result, the plain text file may be ignored. As another example, ingest block 230 may determine that a file is a document created by the MICROSOFT WORD application. Ingest block 230 may then retrieve one or more policies associated with MICROSOFT WORD documents. Ingest block 230 may examine the retrieved policy or policies and determine that the received file should be analyzed for malware. Ingest block 230 may also examine the retrieved policy or policies and determine the malware detection schemes that should be applied to the MICROSOFT WORD document. Ingest block 230 may then create and store entries in data storage consistent with the determined malware detection schemes.

Scheduler block 240, in various embodiments, may be implemented using software, hardware or a combination of the two. Scheduler Block 240 may reside on the same hardware as blocks 230 and/or 250-280 or it may reside on separate hardware. Scheduler block 240, in some embodiments, may determine the order in which malware detection processes are performed. Scheduler block 240 may assign processes to various computing resources of client 200 using any suitable method. For example, scheduler block 240 may use a first-in-first-out (FIFO) algorithm to assign processes. Processes may also be prioritized. For example, scheduler block 240 may use a FIFO approach to schedule jobs initially, but it may be determined to prioritize one job over another in response to results provided by the detection clients. Schedule policies may be used by scheduler block 240 to determine how to schedule jobs and how to prioritize jobs. Priorities for jobs, in some embodiments, may also be determined based on the context associated with the file. For example, if the file undergoing analysis was part of an email attachment, it may be prioritized higher than other files.

In some embodiments, policies used by scheduler block 240 may be modified when a new malware detection scheme is added. Information may be entered regarding how to apply the malware detection scheme. For example, such information may be entered using a tabbed interface, a wizard-style interface, or other interfaces for entering information. The information entered may include how jobs should be prioritized, the context associated with the file, which clients 102 are involved in implementing the malware detection scheme, and/or other items associated with applying a malware detection scheme.

Detection block 250, in various embodiments, may be operable to perform the test(s) that were determined by ingest block 230 in accordance with scheduling performed by scheduler block 240. In certain embodiments, detection block 250 may conform to an interface standard for applying malware detection. Such an interface may include standards for one or more of the following: specifying the file (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes.

In some embodiments, having such an interface may be advantageous because it may allow policies to call for the application of malware detection schemes without having to give precise parameters based on the configuration of the detection client. In this manner, in various embodiments, new detection schemes may be added to the system without needing to recode various parts of the system since the detection client applying the new malware detection scheme would conform to the interface standard. For example, to add a new malware detection scheme, the detection client applying the new malware detection seem may be configured to conform to the interface standard by being configured to receive files for analysis in the same or similar manner as other configuration clients applying other malware detection schemes. In addition, for example, the configuration client applying the new malware detection scheme may be configured to report the results of applying the new malware detection scheme in the same or similar manner as other configuration clients applying other malware detection schemes. This, in some embodiments, may be advantageous in that it allows for the system to adapt to new malware detection schemes.

Detection block 250 may be implemented on a variety of types of hardware. For example, detection block 250 may be configured in a blade architecture or on physical hosts. Detection block 250 may also be configured utilizing clusters or other suitable distributed computing architectures. Detection block 250 may utilize virtualization and/or may include virtual machines. Detection block 250 may be used to apply a variety of malware detection schemes to a file (which, in some embodiments, may include one or more URLs). In some embodiments, detection block 250 may be specialized such that client 200 may be configured to apply a type of malware detection scheme. For example, detection block 250 may be configured to apply behavior-based malware detection schemes and/or metadata-based detection schemes when metadata of a file is analyzed. In yet another example, detection block 250 may be configured to apply signature-based detection schemes to files. As another example, detection block 250 may also apply classification-based detection schemes. As described above, detection block 250 may be configured to apply other forms of detection schemes that conform to an interface to facilitate the incorporation of new or different detection schemes.

Disposition block 260, in certain embodiments, may be operable to utilize the results of the tests performed by detection block 250 to determine what should be done with the file(s). In some cases, disposition block 260 may characterize the file as being suspected of malware. In response, client 200 may send information corresponding to the file(s) and/or actual content of the file(s) for further review at analysis console 104. In various embodiments, disposition block 260 may respond to the results of detection block 250 regardless of whether it sends the file(s) to analysis console 104. For example, disposition block 260 may determine that the file(s) should be quarantined and send the file to server block 280 to quarantine the file. In some embodiments, disposition block 260 may also determine that the file(s) are not malware and may perform suitable corresponding actions. For example, disposition block 260 may release for delivery a message to which the analyzed file(s) were attached, in response to the determination by disposition block 260 that the file(s) are not malware.

Server 280 may include, for example, a file server, a domain name server, a proxy server, a web server, a computer workstation, or any other tangible device and associated logic operable to communicate with blocks 230, 240, 250, 260, and/or 280 through network 220. Server 280 may execute with any of the well-known MS-DOS, PC-DOS, OS-2, MAC-OS, WINDOWS™, UNIX, or other appropriate operating systems, including future operating systems. In certain embodiments, server 280 may include one or more of the following in any suitable combination: a processor, data storage, a network interface, input functionality, and output functionality.

Figure 3:
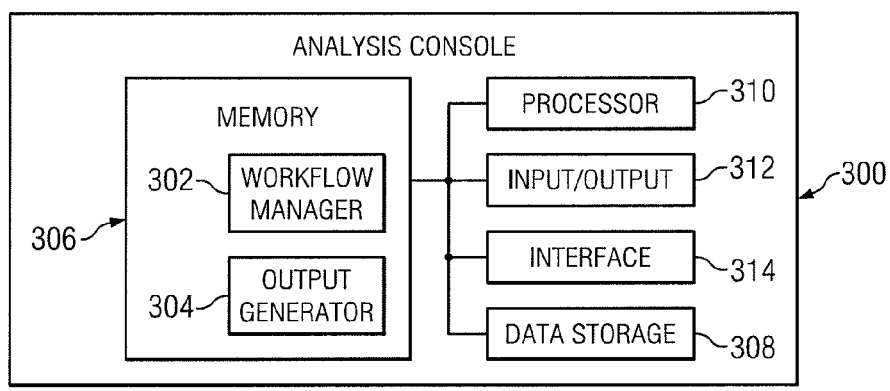
FIG. 3 illustrates one embodiment of an analysis console suitable for implementing one or more portions of particular embodiments.

FIG. 3 illustrates one embodiment of an analysis console 300. In certain embodiments, analysis console 300 may be substantially similar to analysis console 104 of FIG. 1. As shown in FIG. 3, analysis console 300 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In some embodiments, workflow manager 302 may determine a workflow. A workflow is an ordered list of tasks related to malware analysis. Execution of a workflow starts with the task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of analysis console 300. The information analyzed may correspond to a file and/or may include actual content of the file.

In certain instances, a file or information corresponding to the file may be presented to a human analyst for review based on a prior characterization of the file. For example, if client 200 characterizes the file as being suspected of malware then a human analyst may review the file to determine if it is in fact malware. As another example, if the file is determined to be malware rather than merely to be suspected malware, a human analyst may review the file in order to learn more about the malware in the file and/or to start an incident response review (e.g., to rerun the file from the infected host). In such and other scenarios, workflow manager 302 may determine a workflow associated with reviewing the file. In some embodiments, workflow manager 302 may generate a set of tasks to be performed by a human analyst reviewing the file based on a variety of factors. Such factors could include the type of file being reviewed and the characterization of the file by client 200. As another example, if the file is determined to be known malware, then workflows associated with cleaning up the environment(s) the file has been in as well as other incident response workflows (e.g., notifying a user or an administrator) may be determined. Other suitable workflows may be generated based on these or other suitable factors.

In various embodiments, workflow manager 302 may automatically perform certain tasks to facilitate the review of the file by the human analyst. For example, it may be determined that in order for a file to be properly reviewed by a human analyst, all strings in the file should be extracted. Workflow manager 302 may automate this extraction procedure. Workflow manager 302 may also provide a priority associated with the review of the file. For example, if it is determined that a file has a higher probability of containing malware, then a higher priority may be assigned to the review of the file. Workflow manager 302 may also provide a display that enables the human analyst to review the workflow, the file being analyzed, and/or information pertaining to that file.

Output generator 304, in certain embodiments, may be operable to generate a malware analysis output. In various embodiments, the output may include an identifier of the file or files analyzed. For example, an identifier might include a hash of all or a portion of a file analyzed at analysis console 300. The hash may be at least substantially equivalent to a hash generated by the ingest block 230 of the client 200 requesting the file to be further analyzed for malware. Certain outputs generated by output generator 304 may include an indication of whether the file (or files) analyzed at output generator 304 contain malware.

According to one embodiment, the output generated by output generator 304 may be sent to the client 102 requesting the particular analysis performed in generating that output. The receiving client 102 may be configured to use the output to determine whether all or a portion of another file accessed by that client 102 comprises content substantially equivalent to content of a file previously analyzed by the client 102 or another component of system 100. For example, the output may be used to determine whether content of newly accessed file is at least 95% equivalent to content of a previously analyzed file. Although a 95% equivalency value is used in this example, other equivalency thresholds may be used in comparing content of files (e.g., equivalency thresholds of 90%, 98%, 99%, 99.99%, 100%, etc.)

Clients 102 may each be operable to generate hashes of files they access and determine whether the hashes are equivalent or substantially equivalent to hashes received as outputs from output generator 304. If the hash matches the hash of a file previously determined to contain malware, the client 102 accessing the file may determine that the accessed file contains malware. However, if the hash matches the hash of a file previously determined not to contain malware, client 102 accessing the file may determine that the accessed file does not contain malware.

Memory 306 and data storage 308 may each comprise any number of tangible storage media. Additionally, all or part of memory 306 and/or data storage 308 could reside locally within analysis console 300 or could reside at a location external but accessible to analysis console 300 (e.g., within removable media, and/or at an external database).

Processor 310 may refer, for example, to the one or more tangible devices of analysis console 300 capable of carrying out instructions, such as that of a computer program. In certain embodiments, processor 310 may comprise the primary element or elements executing or realizing various logic-based functions, including, for example, the functions of workflow manager 302 and an output generator 304.

I/O functionality 312 may comprise, for example, any communication method of analysis console 300 (e.g., from an image buffer to a display). In some embodiments, input functionality may comprise, for example, the receiving signals or data by analysis console 300. In other embodiments, output functionality may comprise, for example, the communication of signals or data by analysis console. These terms may also refer to part of an action, such as, for example, to "perform I/O" may involve performing an input and/or output operation. In some cases, one or more communication devices of analysis console 300 may be used to implement both input and output functionality.

Interface 314 may comprise, for example, any tangible device(s) that may be used (e.g., by a person, or by another device or system) to communicate with analysis console 300. For example, keyboards and mice may be considered input interfaces 314 of some analysis consoles 300, while monitors and printers may be considered output interfaces of some analysis consoles 300.

In certain embodiments, the described processing and memory elements (such as memory 306 and processors 310) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, analysis console 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Figure 4:
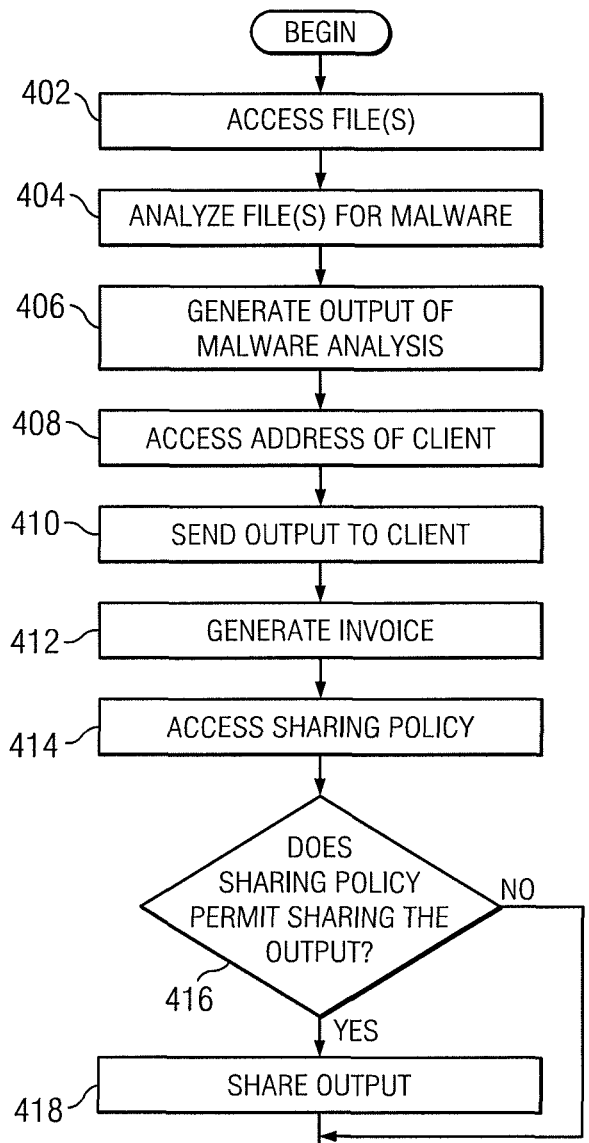
FIG. 4 is a flowchart illustrating one embodiment of processing files in a malware detection system.

FIG. 4 is a flowchart illustrating an example method of distributed malware analysis. In step 402, one or more files are accessed. In certain embodiments, the accessed file or files may be included in queue of files from various sources requesting malware analysis. For example, each accessed file may correspond to a respective one of a plurality of clients 102 that are each capable of facilitating the submission of malware analysis requests. In particular, a first file accessed in step 402 may correspond to a first remote client 102 used in submitting a request to analysis console 104 for malware analysis of that first file. If the first file is encrypted, the first file may be decrypted, for example, using a key shared with the first remote client 102. In particular embodiments, each accessed file may include data indicating a result of a preliminary malware analysis performed by one of a plurality of remote clients 102 on at least a portion of the accessed file or files.

Certain embodiments may be capable of accessing files in a variety of contexts. For example, system 100 may be used to perform malware analysis in a messaging environment. Suitable messaging environments include, but are not limited to, an email environment, an instant messaging environment, a peer-to-peer messaging environment, a chat environment, or other messaging environments. In a particular example, an email attachment may be accessed in step 402. As another example, files may be accessed in contexts where files are downloaded and/or uploaded. For example, some or all of system 100 may be utilized in File Transfer Protocol (FTP) sessions, Wiki sessions, online message boards (such as forums), or other interactive environments. In other example, files may be accessed in Web browsing context. In such a context, some or all of system 100 may analyze requested Web pages and determine if they are malicious. In a Web browsing context, accessing a "file" may comprise accessing one or more URLs.

In step 404, the one or more accessed files may be analyzed at analysis console 104 for malware. According to one embodiment, all or a portion of the one or more accessed files and/or information corresponding to those file(s) may be presented to a human analyst for review at analysis console 104. In particular embodiments, the malware analysis performed in step 404 may include accessing input from the human analyst collected via a human interface.

In step 406, an output may be generated that includes an indication of whether the one or more analyzed files is known to contain malware or is known to be free of malware. In certain embodiments, the output may include an identifier of the file or files analyzed. Various outputs may be usable by other remote clients 102 to determine whether other files at those remote clients 102 comprise content substantially equivalent to content of the file or files analyzed in step 404, as described further below. In particular embodiments, the output may be generated by output generator 304 of analysis console 300, as described previously.

In step 408, an address may be accessed of a first remote client 102 of a plurality of remote clients 102, each of which may be capable of facilitating the submission of malware analysis requests. In certain embodiments, the first remote client 102 may correspond to the one or more files analyzed for malware. For example, the first remote client 102 may have facilitated the submission of a request that one or more files be analyzed for malware. In certain embodiments, the one or more files analyzed for malware may include data indicating the address for the first remote client 102.

In step 410, an output is sent in a communication addressed to the first remote client 102 corresponding to the one or more files analyzed for malware. For example, the output may be sent from analysis console 102 to a first remote client 102 corresponding to the address accessed in step 408. In certain embodiments, the output may include a parameter usable by the first remote client 102 in identifying another instance of the one or more files analyzed for malware.

In step 412, an invoice is generated. For example, the invoice may be generated by analysis console 104 based on the analysis performed at analysis console 104. In certain embodiments, the invoice includes an indication of a fee to be paid by a customer associated with the first remote client 102 corresponding to the one or more accessed files. The fee may be calculated, for example, based at least in part on a duration of time that elapsed during the malware analysis of the one or more accessed files. As another example, the fee may be calculated on a per incident basis for the malware analysis of the one or more accessed files.

In step 414, a sharing policy is accessed. The sharing policy may be associated with the first remote client 102 corresponding to the one or more files analyzed for malware. In certain embodiments, the sharing policy may indicate what type of information a respective client 102 is willing to share with other clients 102.

In step 416, a determination is made regarding whether or not all or a portion of the output will be shared with a second remote client 102 of the plurality of remote clients 102. In certain embodiments, the determination may be based at least in part on the accessed sharing policy. If it is determined that all or a portion of the output may be shared with a second remote client 102, then the output may be shared in step 418 in shortly after such a determination. Alternatively, if it is determined that all or a portion of the output may be shared with a second remote client 102, then the sharing of the output in step 418 may be delayed until the second remote client 102 requests a similar malware analysis. For example, a determination may be made that the one or more files requested to be analyzed for malware by the second remote client 102 had been previously analyzed in connection with a request from the first remote client 102. If it is determined that a file has been analyzed previously, malware detection schemes may not be applied to the file; instead, the results of the previous analysis of the file may be determined using one or more databases that contain results of a previous analysis of the file. According to one embodiment, an identifier may be generated for each file requested to be analyzed for malware so that the same or a substantially similar file may later be identified. In certain instances, all or a portion of the identifier may be determined by performing a hash on all or a portion of the file requested to be analyzed for malware. Example hashes that may be used include a checksum, an MD5 hash, a SHA1 hash, any combination of the preceding, or any other suitable type of hash.

In certain embodiments, the sharing policies of various remote clients 102 may be used to split malware analysis costs between those remote clients 102. For example, if two different remote clients 102 request malware analysis of substantially similar files, and if the respective sharing policies of those two remote clients 102 allow outputs to be shared between them, then the invoice generated in step 412 may be apportioned between those two remote clients 102 such that each receives a respective portion of the total invoice amount. In this manner, the malware analysis of identical or substantially similar files may be performed once and costs may be partitioned among those remote clients 102 requesting the malware analysis. In certain instances, costs may be apportioned between remote clients 102 without revealing to any one remote client 102 the identity of the other remote clients 102 billed for that particular malware analysis.

Throughout this disclosure, reference to computer-readable storage media may include, as examples and not by way of limitation, any suitable combination of a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or other suitable computer-readable storage media.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented method, comprising:

accessing, using one or more processing units, a first file of a plurality of files requested to be analyzed for malware, each of the plurality of files corresponding to a respective remote client of a plurality of remote clients;

processing, using the one or more processing units, an analysis of the first file for malware;

generating, using the one or more processing units, an output comprising an indication of whether the first file comprises malware;

accessing, using the one or more processing units, an address for a first remote client of the plurality of remote clients, the first remote client being the respective remote client corresponding to the first file;

sending, using the one or more processing units, the output in a first communication addressed to the first remote client corresponding to the first file;

accessing a sharing policy corresponding to the first remote client, the sharing policy indicating a type of information a first customer is willing to share with the plurality of remote clients;

determining to share, based at least in part on the sharing policy, the output with a second remote client of the plurality of remote clients;

sending the output, in response to the determination to share the output, in a second communication addressed to the second remote client of the plurality of remote clients;

apportioning a fee based at least in part on the determination to share the output;

generating a first invoice indicating the fee to be paid by the first customer associated with the first remote client; and generating a second invoice indicating a second fee to be paid by a second customer associated with the second remote client;

wherein apportioning the fee includes apportioning the second fee based at least in part on the determination to share the output.

2. The method of claim 1, wherein generating the invoice comprises calculating the fee based at least in part on a duration of time that elapsed during the processing of the analysis of the first file for malware.

3. The method of claim 1, wherein the fee is calculated on a per incident basis for the processing of the analysis of the first file for malware.

4. The computer-implemented method of claim 1, wherein the output further comprises a parameter corresponding to the first file, the parameter usable by the first remote client in identifying another instance of the first file.

5. The method of claim 1, wherein the first file comprises data indicating a result of a preliminary analysis of at least a portion of the first file for malware, the analysis conducted at the first remote client.

6. The method of claim 1, wherein the first file comprises data indicating the address for the first remote client.

7. The method of claim 1, wherein accessing the first file comprises accessing an email attachment.

8. The method of claim 1, further comprising decrypting the first file using a key.

9. The method of claim 1, wherein processing the analysis of the first file for malware comprises accessing input collected via a human interface.

10. A computing system comprising:

an analysis console comprising one or more processing units, the analysis console operable to:

access a first file of a plurality of files requested to be analyzed for malware, each of the plurality of files corresponding to a respective remote client of a plurality of remote clients;

process an analysis of the first file for malware;

generate an output comprising an indication of whether the first file comprises malware;

access an address for a first remote client of the plurality of remote clients, the first remote client being the respective remote client corresponding to the first file; send the output in a first communication addressed to the first remote client corresponding to the first file;

access a sharing policy corresponding to the first remote client, the sharing policy indicating a type of information a first customer is willing to share with the plurality of remote clients;

determine, based at least in part on the sharing policy, to share the output with a second remote client of the plurality of remote clients;

send the output in a second communication addressed to the second remote client of the plurality of remote clients;

apportion a fee based at least in part on the determination to share the output;

generate a first invoice indicating the fee to be paid by the first customer associated with the first remote client; and generate a second invoice indicating a second fee to be paid by a second customer associated with the second remote client;

wherein apportioning the fee includes apportioning the second fee based at least in part on the determination to share the output.

11. The computing system of claim 10, wherein the analysis console is further operable to generate the invoice by calculating the fee based at least in part on a duration of time that elapsed during the processing of the analysis of the first file for malware.

12. The computing system of claim 10, wherein the fee is calculated on a per incident basis for the processing of the analysis of the first file for malware.

13. The computing system of claim 10, wherein the output further comprises a parameter corresponding to the first file, the parameter usable by the first remote client in identifying another instance of the first file.

14. The computing system of claim 10, wherein the first file comprises data indicating a result of a preliminary analysis of at least a portion of the first file for malware, the analysis conducted at the first remote client.

15. The computing system of claim 10, wherein the first file comprises data indicating the address for the first remote client.

16. The computing system of claim 10, wherein the first file is an email attachment.

17. The computing system of claim 10, wherein the analysis console logic is further operable to decrypt the first file using a key.

18. The computing system of claim 10, wherein the analysis console is further operable to process the analysis of the first file for malware by accessing input collected via a human interface.

19. Computer-readable non-transitory storage media comprising logic that is operable when executed to:

access a first file of a plurality of files requested to be analyzed for malware, each of the plurality of files corresponding to a respective remote client of a plurality of remote clients;

process an analysis of the first file for malware;

generate an output comprising an indication of whether the first file comprises malware;

access an address for a first remote client of the plurality of remote clients, the first remote client being the respective remote client corresponding to the first file;

send the output in a first communication addressed to the first remote client corresponding to the first file;

access a sharing policy corresponding to the first remote client, the sharing policy indicating a type of information a first customer is willing to share with the plurality of remote clients;

determine, based at least in part on the sharing policy, to share the output with a second remote client of the plurality of remote clients;

send the output in a second communication addressed to a second remote client of the plurality of remote clients;

calculate a first fee and a second fee that are apportioned based at least in part on the determination to share the output;

generate a first invoice indicating the first fee to be paid by the first customer associated with the first remote client; and generate a second invoice indicating the second fee to be paid by a second customer associated with the second remote client.

20. The Computer-readable storage media of claim 19, wherein the first fee is calculated on a per incident basis for the processing of the analysis of the first file for malware.

21. The Computer-readable storage media of claim 19, wherein a first identity of the first customer and a second identity of the second customer are not revealed to the each other.

* * * * *